US010384593B2

(12) United States Patent
Altobelli

(10) Patent No.: US 10,384,593 B2
(45) Date of Patent: Aug. 20, 2019

(54) DELIVERY AND COLLECTION VEHICLE

(71) Applicant: Pratt Corrugated Holdings, Inc., Conyers, GA (US)

(72) Inventor: Michael Altobelli, New Fairfield, CT (US)

(73) Assignee: Pratt Corrugated Holdings, Inc., Conyers, GA (US)

( * ) Notice: Subject to any disclaimer, the term of this patent is extended or adjusted under 35 U.S.C. 154(b) by 69 days.

(21) Appl. No.: 15/869,568

(22) Filed: Jan. 12, 2018

(65) Prior Publication Data

US 2019/0217766 A1 Jul. 18, 2019

(51) Int. Cl.
| | |
|---|---|
| *B60P 7/14* | (2006.01) |
| *B60P 3/00* | (2006.01) |
| *B60P 1/64* | (2006.01) |
| *B60R 7/00* | (2006.01) |
| *B60R 7/02* | (2006.01) |
| *B60R 7/08* | (2006.01) |
| *B60P 7/135* | (2006.01) |

(52) U.S. Cl.
CPC .............. *B60P 7/14* (2013.01); *B60P 1/649* (2013.01); *B60P 1/6427* (2013.01); *B60P 3/007* (2013.01); *B60P 7/135* (2013.01); *B60R 7/005* (2013.01); *B60R 7/02* (2013.01); *B60R 7/08* (2013.01)

(58) Field of Classification Search
CPC .......... B60P 1/649; B60P 3/007; B60P 3/205; B60P 7/135; B60P 7/14; B60R 7/005; B60R 7/02; B60R 7/08
USPC ................... 296/24.36, 24.37, 24.4, 24.44
See application file for complete search history.

(56) References Cited

U.S. PATENT DOCUMENTS

| | | | |
|---|---|---|---|
| 2,605,912 A | 8/1952 | Small et al. | |
| 2,816,502 A | 12/1957 | Eismann | |
| 3,355,044 A | 11/1967 | Nelson | |
| 3,367,287 A | 2/1968 | Dunlop | |
| 3,467,001 A | 9/1969 | Balbi | |
| 3,557,683 A | 1/1971 | Boyd | |
| 3,752,529 A | 8/1973 | Remke et al. | |
| 3,929,371 A | 12/1975 | Gibson | |

(Continued)

FOREIGN PATENT DOCUMENTS

| | | |
|---|---|---|
| AU | 4192293 | 9/1993 |
| CA | 2343552 | 10/2001 |

(Continued)

OTHER PUBLICATIONS

Cardboard Balers; Article entitled: "Trailer Cardboard Baler—The Perfect Portable Waste Management Solution", publicly available prior to Jan. 12, 2018, 3 pgs.

(Continued)

*Primary Examiner* — Jason S Daniels
(74) *Attorney, Agent, or Firm* — Taylor English Duma LLP

(57) ABSTRACT

A vehicle includes a front end, a rear end, a driver's side, and a passenger's side, the vehicle defining a cargo compartment proximate the rear end; a partition wall movably disposed within the cargo compartment, the partition wall defining a partition such that the cargo compartment defines a delivery cargo compartment and a collection cargo compartment; a one delivery storage unit disposed within the delivery cargo compartment; and a collection system disposed within the collection cargo compartment.

20 Claims, 14 Drawing Sheets

(56) References Cited

U.S. PATENT DOCUMENTS

| | | | |
|---|---|---|---|
| 4,242,953 A | 1/1981 | St-Gelais | |
| 4,840,531 A | 6/1989 | Dinneen | |
| 4,915,570 A | 4/1990 | Rath et al. | |
| 5,042,863 A | 8/1991 | Fraga | |
| 5,078,567 A | 1/1992 | Lombardo | |
| 5,116,184 A | 5/1992 | Pellegrini | |
| 5,123,801 A | 6/1992 | O'Daniel | |
| 5,458,452 A | 10/1995 | Pellegrini | |
| 5,484,246 A | 1/1996 | Horning et al. | |
| 5,628,442 A | 5/1997 | Wayne | |
| 5,681,140 A | 10/1997 | Christenson | |
| 5,709,252 A | 1/1998 | Princiotta et al. | |
| 5,823,728 A | 10/1998 | Veldman et al. | |
| 5,829,842 A | 11/1998 | Lombardo | |
| 5,988,972 A | 11/1999 | Boivin | |
| 6,027,300 A | 2/2000 | Rchards | |
| 6,099,070 A | 8/2000 | Yocum | |
| 6,270,138 B1 | 8/2001 | Laskowski et al. | |
| 6,302,636 B1 | 10/2001 | Duron | |
| 6,398,478 B2 | 6/2002 | Smith et al. | |
| 6,457,764 B1 | 10/2002 | Brannon | |
| 6,499,931 B1 | 12/2002 | Garrett, Jr. et al. | |
| 6,626,093 B1 | 9/2003 | Van Der Touw et al. | |
| 6,814,396 B2 | 11/2004 | Greer et al. | |
| 6,953,316 B2 | 10/2005 | Neufeldt et al. | |
| 6,974,170 B2 | 12/2005 | Mulvihill | |
| 7,293,813 B2 | 11/2007 | Squyres et al. | |
| 7,338,110 B1 | 3/2008 | Eckloff | |
| 7,641,253 B2 | 1/2010 | Steiger et al. | |
| 7,731,255 B2 | 6/2010 | McJunkin | |
| 7,823,949 B2 | 11/2010 | Vandenheuvel et al. | |
| 8,172,296 B2 | 5/2012 | Umeda et al. | |
| 8,186,917 B2 * | 5/2012 | Nelson | B60P 3/205 410/129 |
| 8,894,122 B2 | 11/2014 | Gilbert et al. | |
| 8,944,483 B2 | 2/2015 | Richter | |
| 9,387,788 B1 | 7/2016 | Stroup et al. | |
| D763,139 S | 8/2016 | Giolito | |
| D778,786 S | 2/2017 | Giolito | |
| 9,713,977 B1 * | 7/2017 | Neal | B60P 1/4442 |
| D801,909 S | 11/2017 | Tuncel | |
| 2003/0025017 A1 | 2/2003 | Van Der Lely | |
| 2003/0178868 A1 | 9/2003 | Lapsley | |
| 2008/0012372 A1 | 1/2008 | Squyres et al. | |
| 2008/0131226 A1 | 6/2008 | Pesson | |
| 2008/0142560 A1 | 6/2008 | Lim | |
| 2008/0199290 A1 | 8/2008 | Traylor | |
| 2014/0008932 A1 | 1/2014 | Fought et al. | |
| 2017/0096294 A1 | 4/2017 | Johnson | |
| 2017/0217396 A1 * | 8/2017 | Paunov | B60P 1/435 |
| 2017/0225601 A1 * | 8/2017 | Borders | B60P 1/6418 |

FOREIGN PATENT DOCUMENTS

| | | |
|---|---|---|
| CN | 104760792 | 7/2015 |
| DE | 19739603 | 3/1999 |
| DE | 102008034217 | 1/2010 |
| DE | 102012004976 | 9/2013 |
| EP | 2386504 | 11/2011 |
| EP | 2767491 | 8/2014 |
| FR | 2686326 | 7/1993 |
| GB | 856801 | 12/1960 |
| GB | 2263093 | 7/1993 |
| GB | 2468351 | 9/2010 |
| KR | 20100018824 | 2/2010 |
| WO | 9301111 | 1/1993 |
| WO | 2009062482 | 5/2009 |
| WO | 2010136167 | 12/2010 |

OTHER PUBLICATIONS

Encore Systems; Article entitled: "Encore Packer model EP100P portable waste tire baler", located at <http://www.tirebaler.com/balers.html>, copyright 2016, 2 pgs.

QCR Recycling Equipment; Article entitled: "Cardboard Recycling Balers and Compactors", publicly available prior to Jan. 12, 2018, located at <https://www.qcr.co.uk/balers-compactors/cardboard-baler>, 2 pgs.

Ranger Design, Inc.; Article entitled: "Ford Transit Gallery", located at <https://rangerdesign.com/vehicles/ford-transit/transit-gallery/>, accessed on Nov. 9, 2017, 5 pgs.

Utility Trailer; Article entitled: "3000R Multi Temp", located at <https://www.utilitytrailer.com/trailer/3000r-multi-temp/>, accessed on Nov. 15, 2017, 3 pgs.

* cited by examiner

DELIVERY AND COLLECTION VEHICLE

TECHNICAL FIELD

This disclosure relates to vehicles. More specifically, this disclosure relates to vehicle modifications.

BACKGROUND

As market share of consumer purchases in electronic commerce (hereinafter "e-commerce") continually increases, associated numbers of home deliveries have increased, and the usage of packaging—particularly corrugated cardboard and associated packaging products—has also continued to rise. As consumers encounter used packaging—termed "old corrugated cardboard" or "OCC"—a growing concern is the disposal of said OCC. Many municipalities have yet to provide municipal recycling services, and those that do have municipal recycling services may recycle OCC in less-than-ideal methods. Consumers often place importance on sustainability, and many consumers will consider the environmental impact of the packaging they use in deciding whether to engage in e-commerce. Simply put, if packaging is not recyclable, many consumers will choose alternative methods of engaging in commerce to avoid mass disposal of packaging. Additionally, OCC can have a commercial value in that the recyclability of OCC can be monetized.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A vehicle includes a front end, a rear end, a driver's side, and a passenger's side, the vehicle defining a cargo compartment proximate the rear end; a partition wall movably disposed within the cargo compartment, the partition wall defining a partition such that the cargo compartment defines a delivery cargo compartment and a collection cargo compartment; a delivery storage unit disposed within the delivery cargo compartment; and a collection system disposed within the collection cargo compartment.

An apparatus for connection to a vehicle includes a partition wall, the partition wall comprising a first side and a second side; a shelving unit connected to the first side of the partition wall; a collection system connected to the second side of the partition wall; and a linear track system connected to at least one end of the partition wall, the track system configured for connection to the vehicle.

A method of delivering packages and collecting recovered materials includes the steps of obtaining a vehicle, the vehicle including a front end, a rear end, a driver's side, and a passenger's side, the vehicle defining a cargo compartment proximate the rear end; a partition wall movably disposed within the cargo compartment, the partition wall defining a partition such that the cargo compartment defines a delivery cargo compartment and a collection cargo compartment; a delivery storage unit disposed within the delivery cargo compartment; and, a collection system disposed within the collection cargo compartment, the vehicle arranged in an initial state and including packages arranged within the delivery cargo compartment; removing at least one of the packages; collecting a recovered material; arranging the recovered material within the collection system; and, linearly actuating the partition wall to alter the size of the delivery cargo compartment and the collection cargo compartment in response to the removal of the package and the collection of the recovered material.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1A:
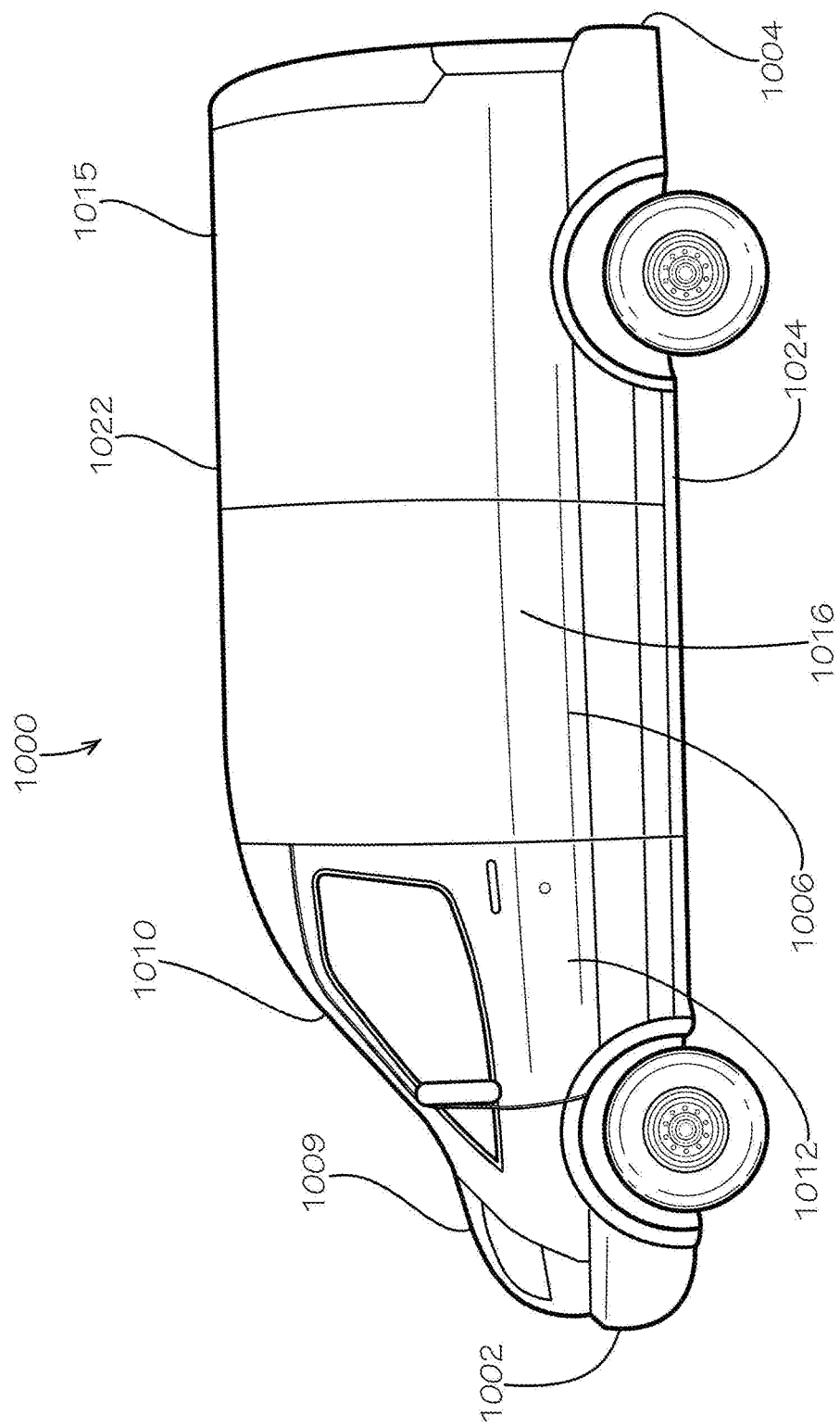
FIG. 1A is a side view of a vehicle in accord with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a vehicle and associated methods, systems, devices, and various apparatus. The vehicle can be a delivery vehicle and can include an apparatus for receiving and collecting recyclables. It would be understood by one of skill in the art that the disclosed vehicle is described in but a few exemplary embodiments among many. No particular terminology or description should be considered limiting on the disclosure or the scope of any claims issuing therefrom.

Figure 1B:
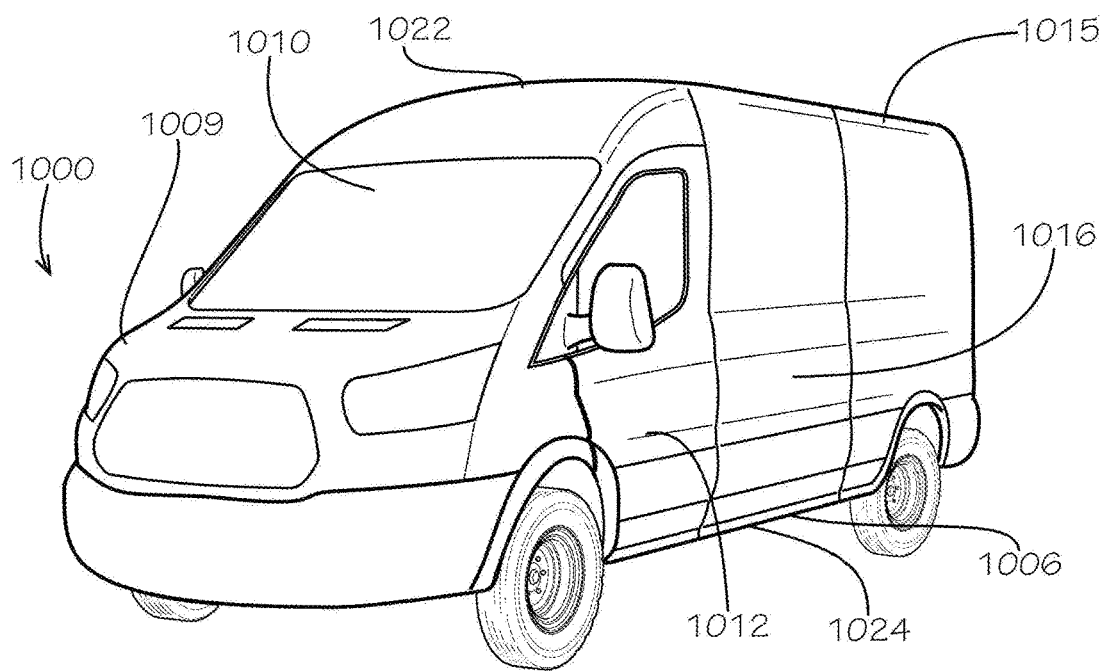
FIG. 1B is a front perspective view of the vehicle of FIG. 1A.
Figure 1C:
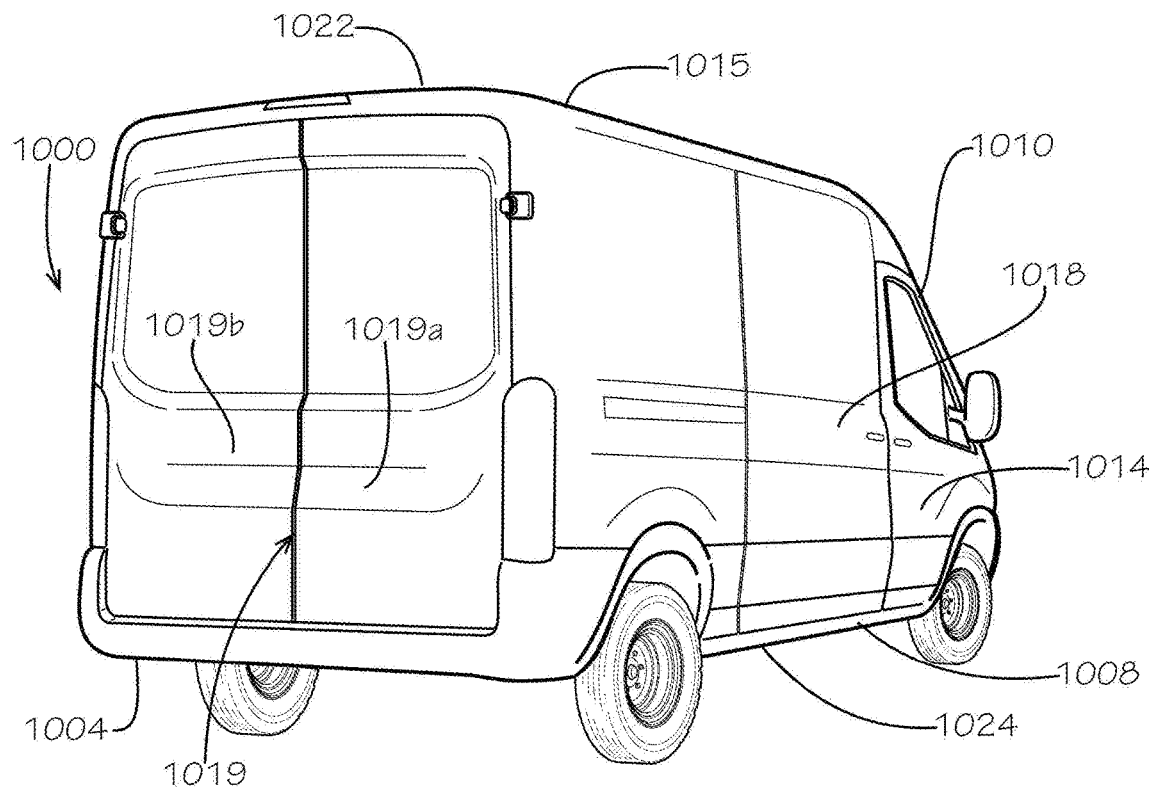
FIG. 1C is a rear perspective view of the vehicle of FIG. 1A.

One embodiment of a vehicle 1000 is disclosed and described with reference to FIGS. 1A-1C. The vehicle 1000 can comprise a front end 1002, a rear end 1004, a driver's side 1006, and a passenger's side 1008. The vehicle 1000 can comprise an engine portion 1009, a passenger compartment 1010 and a cargo compartment 1015. The vehicle 1000 can comprise a driver's side passenger door 1012 and a passenger's side passenger door 1014 that can provide access to the passenger compartment 1010. Similarly, the vehicle 1000 can comprise a driver's side cargo door 1016 and a passenger's side cargo door 1018 that can provide access to the cargo compartment 1015. In various aspects, the various doors 1012,1014,1016,1018 can be traditional swinging doors, sliding doors, gullwing doors, or a variety of other types of doors known in the art. Additionally the vehicle 1000 can comprise a rear door 1019 to cover a rear opening 1021 (shown with reference to FIGS. 2A-2B) defined in the rear end 1004. In the current aspect, the rear door 1019 can comprise a pair of barn-door style doors 1019a,b. In various aspects, the rear door 1019 can comprise a tailgate-style door, a garage-door style door, or various other styles of doors known in the art. The rear door 1019 provides access to the cargo compartment 1015 from the rear end 1004. The vehicle 1000 can include a ceiling 1022 and a bottom 1024. Various base vehicles can be used to form vehicle 1000 and would be understood by one of skill in the art. One suitable base vehicle is the Ford F150 Transit Full-Size Cargo Van. Additional suitable base vehicles include the Ford Econoline Cargo Van, the Chevrolet Express Cargo Van, and the Dodge RAM ProMaster Cargo Van, among others. One of skill in the art would understand that the systems and apparatus disclosed within would be useful or applicable to a variety of vehicles, and no single vehicle or vehicular modification should be considered limiting on the scope of the disclosure.

Figure 2A:
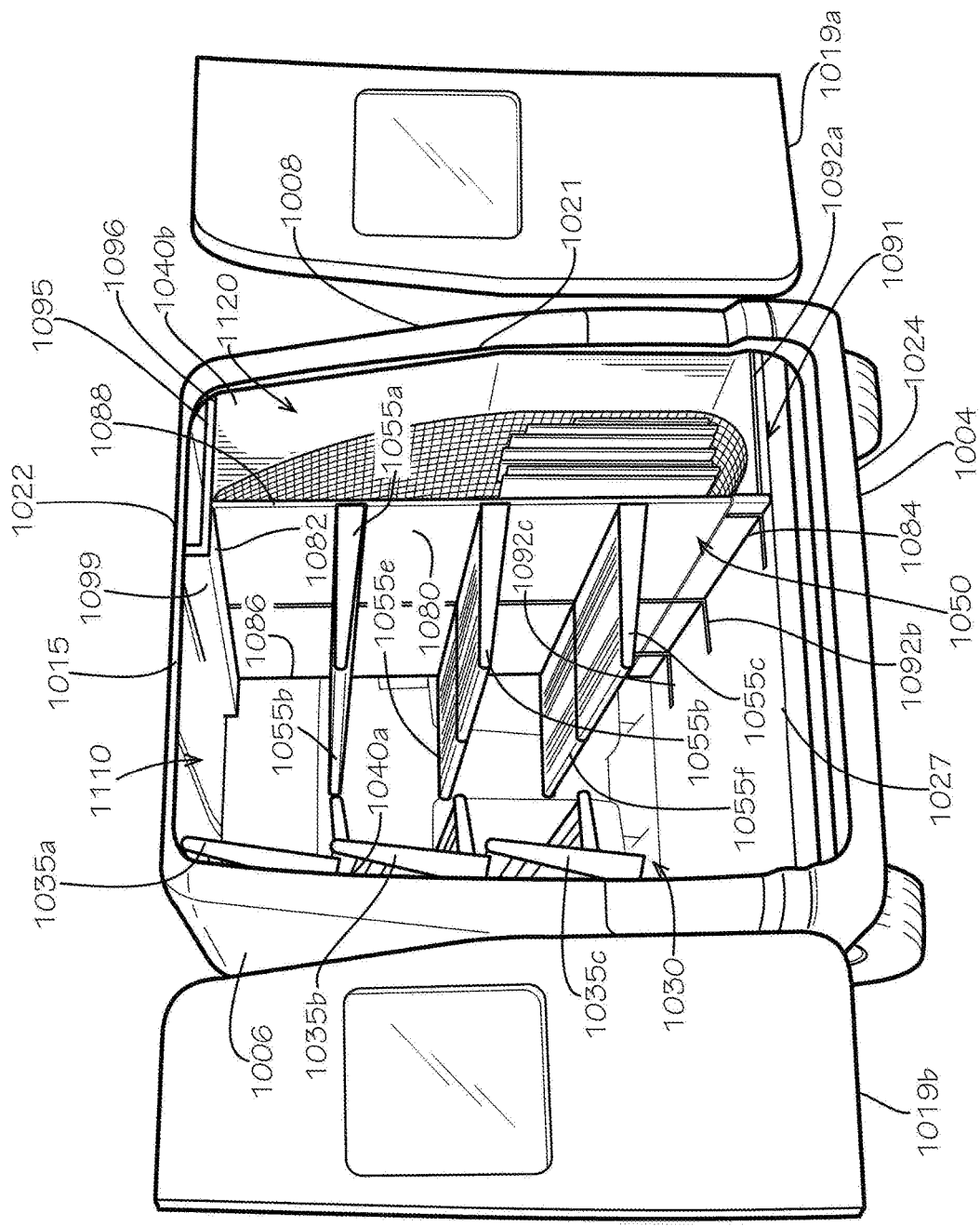
FIG. 2A is a rear perspective view of the vehicle of FIG. 1A with a rear door in the open position.
Figure 2B:
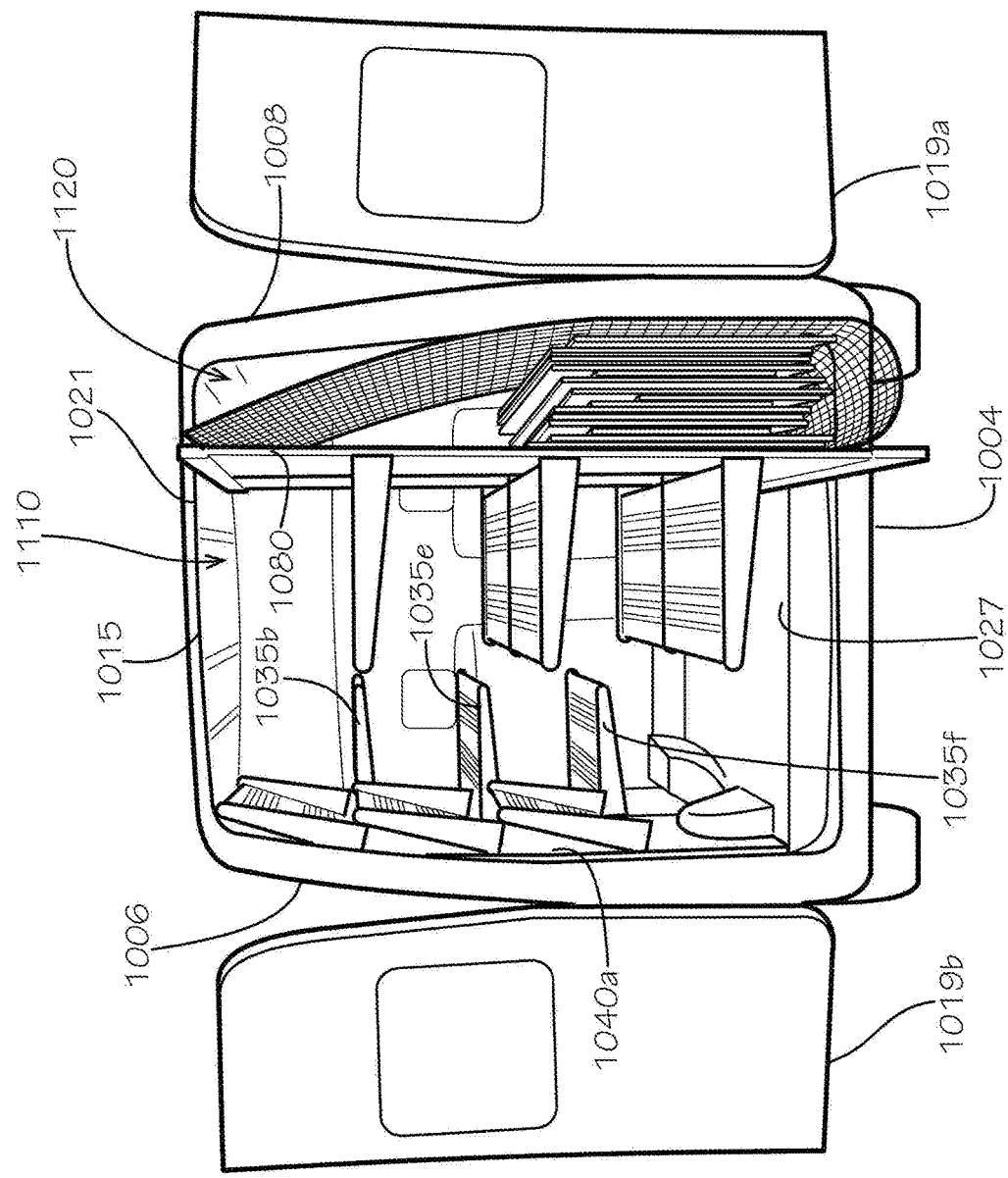
FIG. 2B is a rear side view of the vehicle of FIG. 2A.

In the current aspect, the vehicle 1000 can include various internal systems and apparatus as can be seen with reference to FIGS. 2A-2B. The cargo compartment 1015 can include shelving, tracks, and bays in various aspects as will be discussed in additional detail.

As seen with reference to FIGS. 2A-2B, shelving units 1030, 1050 can be disposed within the cargo compartment 1015. In various aspects, shelving units 1030, 1050 can be omitted entirely; in various aspects, the vehicle 1000 can be devoid of organizational elements; in various aspects, the vehicle 1000 can include additional organizational resources. Each shelving unit 1030, 1050 in the current aspect can include a plurality of shelves 1035*a,b,c,d,e,f* and 1055*a,b,c,d,e,f*, respectively. In the current aspect, shelves 1035, 1055 can be connected to walls 1040*a,b* of the cargo compartment 1015 by various apparatus. As can be seen, shelves 1035 can connect to wall 1040*a* either directly or by way of an apparatus that can allow the shelves 1035 to mount with respect to the wall 1040*a*. In the current aspect, each shelf 1035 can be hingedly connected to the wall 1040*a* such that each shelf 1035 can be collapsed when not in use. Various other apparatus to achieve the same can be implemented, including removable shelves, accordion-style collapsible shelves, fixed connections, integral forming of the shelves 1035 with the wall 1040*a*, and other apparatus as known in the art of shelving and of delivery vehicles.

In contrast with shelving unit 1030 in the current aspect, shelving unit 1050 can comprise, be attached to, or be connected to the vehicle 1000 using a partition wall 1080. Shelves 1055 can be connected to the partition wall 1080 using similar connection apparatus as shelves 1035 connected to wall 1040*a* in the current aspect, although various connections are contemplated within the scope of the current disclosure. In the current aspect, the partition wall 1080 can be movably attached to the vehicle 1000 along the cargo compartment 1015 such that it can change the allotment of space within the cargo compartment 1015 by motion of the wall 1080.

The partition wall 1080 can include a ceiling end 1082, a floor end 1084, a front end 1086, and a rear end 1088. The partition wall 1080 can be movably connected to a floor 1027 of the cargo compartment 1015. In the current aspect, the movable connection of the partition wall 1080 to the floor 1027 can be a track system, such as a utility rail, cargo management system, or other linear or other track connection known to one of skill in the art. Additional connections can be utilized in various aspects, including pivots, hinges, rollers, wheels, or other non-track systems. In various aspects, the partition wall 1080 can be simply contacting and/or disconnected from the floor 1027. In the current aspect, a floor track system 1091 can include a plurality of floor tracks 1092*a,b,c* that can be connected to the floor 1027. The floor tracks 1092*a,b,c* interact with track riders (not shown) on the floor end 1086 of the partition wall 1080. As such, the floor end 1084 of the partition wall 1080 can linearly actuate along the floor 1027 in a direction from driver's side 1006 to passenger's side 1008 and back.

Similarly, in the current aspect the partition wall 1080 can be connected to the ceiling 1022 proximate the ceiling end 1082. In the current aspect, the partition wall 1080 can be connected to a suspended track system 1095. In the current aspect, the suspended track system 1095 can comprise a plurality of tracks (not shown) that can interact with track riders (not shown) located proximate the ceiling end 1082 of the partition wall 1080 that can allow linear actuation of the partition wall 1080 in a direction from driver's side 1006 to passenger's side 1008 and back. The suspended track system 1095 can be anchored to the wall 1040*b* at a wall end 1096 of the system 1095 and can be anchored to the ceiling 1022 at a center end 1098 of the system 1095. In the current aspect, anchoring of the center end 1098 to the ceiling 1022 can occur at a protrusion 1099 of the ceiling 1022. In the current aspect, the protrusion 1099 can comprise a rail, a formed ledge, or another similar anchoring point allowing connection of the suspended track system 1095 to an interior of the ceiling 1022. In the current aspect, the protrusion 1099 can include an upper track 1680 (seen with reference to FIG. 9C) allowing motion of a collection system 1200 (discussed with reference to FIG. 3) in a direction from the front end 1002 to the rear end 1004 of the vehicle 1000. This linear actuation of the collection system 1200 can include linear actuation of the partition wall 1080 in various aspects. In various aspects, linear actuation of the collection system 1200 can include tracks or other mechanical elements that can allow the collection system 1200 to move independent of the partition wall 1080. In various aspects, the suspended track system 1095 can be suspended below the ceiling 1022 to allow easy clearance beyond the rear opening 1021. In various aspects, the suspended track system 1095 can be mounted to the ceiling 1022 directly.

The partition wall 1080 effectively can divide the cargo compartment 1015 into two separate and defined compartments: a delivery cargo compartment 1110 and a collection cargo compartment 1120. Because the partition wall 1080 can move along the various track systems 1091, 1095, the volume of space devoted to the delivery cargo compartment 1110 and the collection cargo compartment 1120 can be variable.

It would be understood by one of skill in the art that the partition wall 1080 as seen in the implementation of the current aspect is but one possible arrangement. In various aspects, the partition wall 1080 can be arranged within the vehicle 1000 in various arrangements. By way of non-limiting example, in various aspects, the partition wall 1080 can be arranged in a driver's side to passenger's side arrangement, orthogonal to the arrangement as shown with reference to FIGS. 2A-2B. In various aspects, the partition wall 1080 can be arranged horizontally such that the partition of the cargo compartment 1015 can occur in vertical space, such that the delivery cargo compartment 1110 can be situated above or below the collection cargo compartment 1120 in various aspects. One of skill in the art would understand that the vehicle 1000 can include multiple partition walls 1080 in various aspects.

Figure 3:
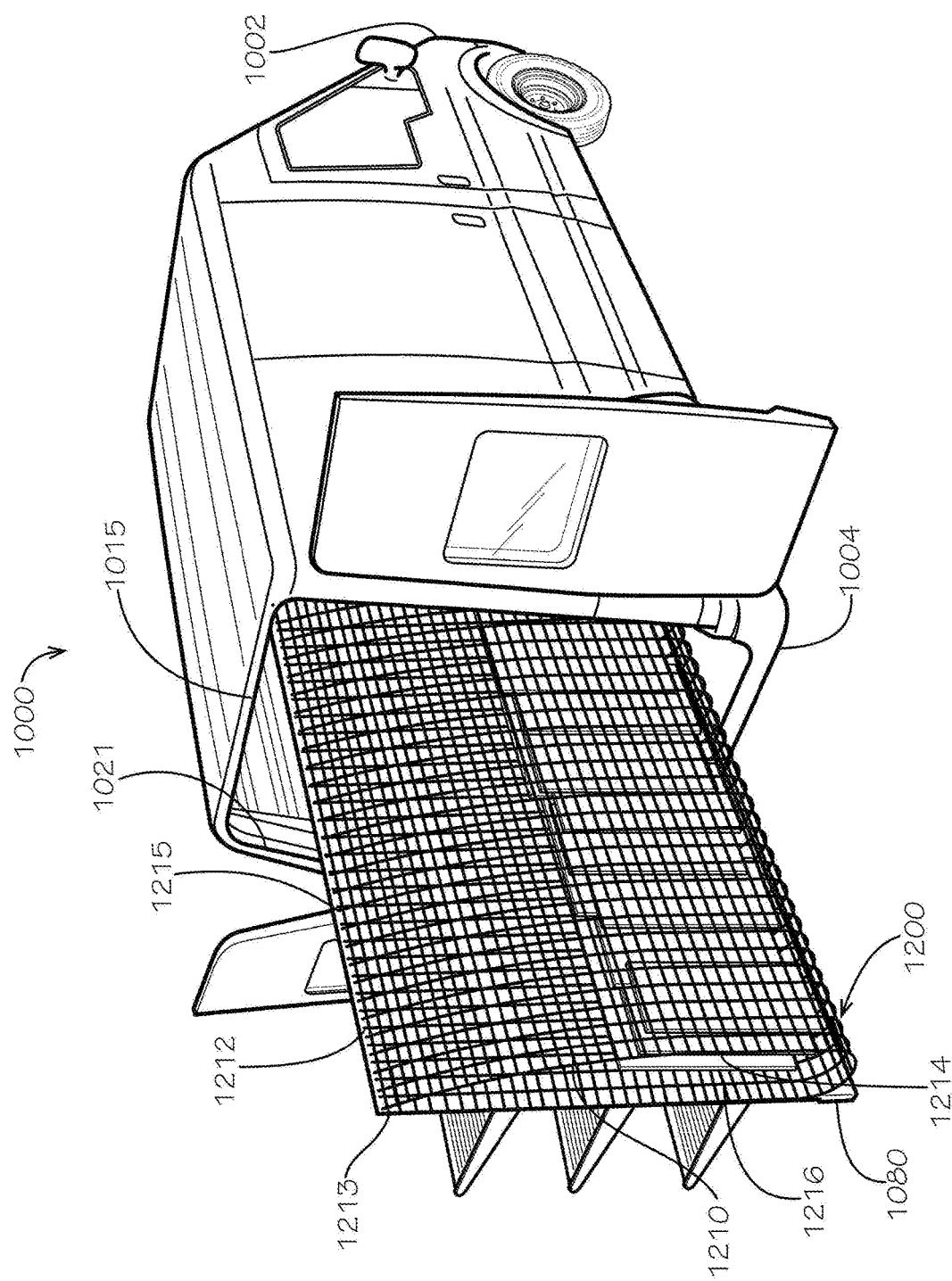
FIG. 3 is a rear perspective view of the vehicle of FIG. 1A with a partition wall extended beyond a rear end of the vehicle.

As can be seen with reference to FIG. 3, at least one of the collection system 1200 and the partition wall 1080 in the current aspect can be configured to actuate linearly in the front-to-rear direction. As mentioned above, in the current aspect, the suspended track system 1095 can be arranged to provide clearance below the ceiling 1022 to allow the collection system 1200 to extend out of the rear opening 1021. As a result, movement of the collection system 1200 beyond the rear end 1004 of the vehicle 1000 can provide additional access to both sides of the collection system 1200, as will be discussed in greater detail later.

The collection system 1200 can be attached to the partition wall 1080 in various aspects. In various aspects, the collection system 1200 can simply occupy the collection cargo compartment 1120 without attachment to the partition wall 1080. In the current aspect, the collection system 1200 can comprise a collection bladder 1210. In various aspects, the collection bladder 1210 can be omitted, and the collection system 1200 can comprise a simple repository within the vehicle 1000. In various aspects, the collection system 1200 can comprise space within the vehicle 1000 devoted to collection. The collection bladder 1210 of the current aspect can be made of various materials that are expandable in various arrangements such as mesh, fabric, bands, bags, and other variable membranes. A top end 1212 of the collection bladder 1210 can provide a connection point between a top end 1213 of an outer facing bladder side 1214 and a top end 1215 of a wall facing bladder side 1216. In the current aspect, the wall facing bladder side 1216 can be in contact with and, in some aspects, can be affixed to the partition wall 1080. In the current aspect, the collection bladder 1210 can be made of one piece of material, and releasable connection between the outer facing bladder side 1214 and the wall facing bladder side 1216 can occur at the top end 1212.

In the current aspect, the collection bladder 1210 can be a mesh cargo net. Because the shape of the mesh cargo net of the collection bladder 1210 can be altered, the volume of material contained within the mesh cargo net collection bladder 1210 can also be variable. As such, as the collection cargo compartment 1120 changes in shape, the collection bladder 1210 can substantially change in shape to match substantially the size of the collection cargo compartment 1120. As such, as additional materials are collected into the collection cargo compartment 1120 within the collection system 1200, the collection bladder 1210 can hold additional collected materials.

In application, the vehicle 1000 can be utilized as a dual-purpose vehicle. In one aspect, the vehicle 1000 can initially be utilized to perform deliveries, a process akin to most e-commerce. However, corrugated cardboard that is often utilized for packaging of delivered materials can pose a challenge to the consumer; specifically, it is of advantage to provide a mechanism to retrieve and to collect used packaging generally referred to as "old corrugated cardboard," or "OCC"—for recycling purposes. In various aspects, the vehicle 1000 can be utilized to retrieve additional materials for recycling, including other types of paper packaging (padded envelopes, mailing tubes, shredding byproducts, paper grocery bags, and non-corrugated cardboard, among others), plastic wrap, shrink film, Styrofoam, and plastic containers, among others. One of skill in the art would understand that the inclusion of OCC is intended to be exemplary and non-limiting on the scope of the current disclosure.

The vehicle 1000 can be used as a collection vehicle in addition to a delivery vehicle, supporting multiple functions and creating a round-trip or "close-the-loop" solution for e-commerce retailers looking to retrieve packaging products from consumers. Retrieving OCC provides multiple advantages, including reducing costs of shipped goods by harvesting recyclable materials and aiding in customer relations by providing end customers a simple solution to collect recyclable OCC. It is conceivable that additional recyclable materials could be collected in addition to OCC.

Figure 4A:
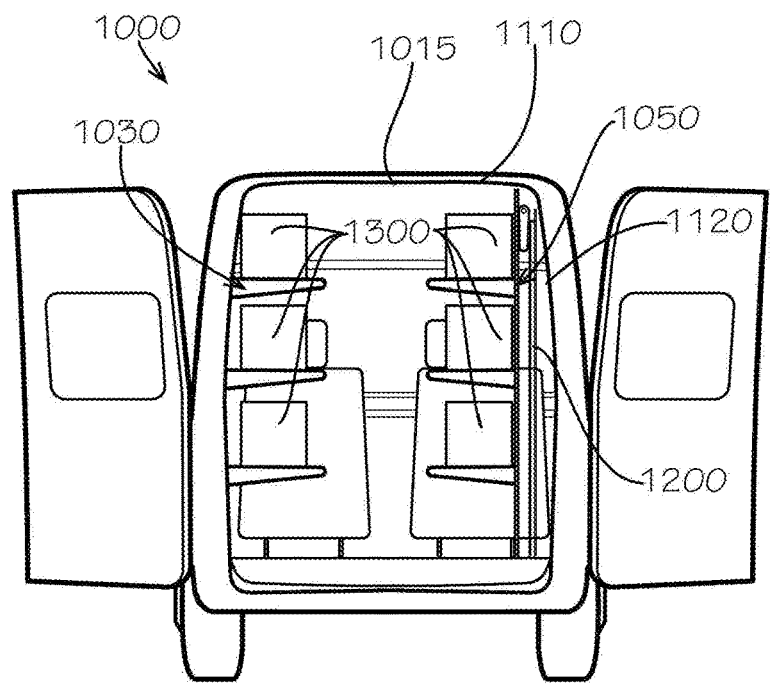
FIG. 4A is a rear side view of the vehicle of FIG. 1A in an initial arrangement.
Figure 4B:
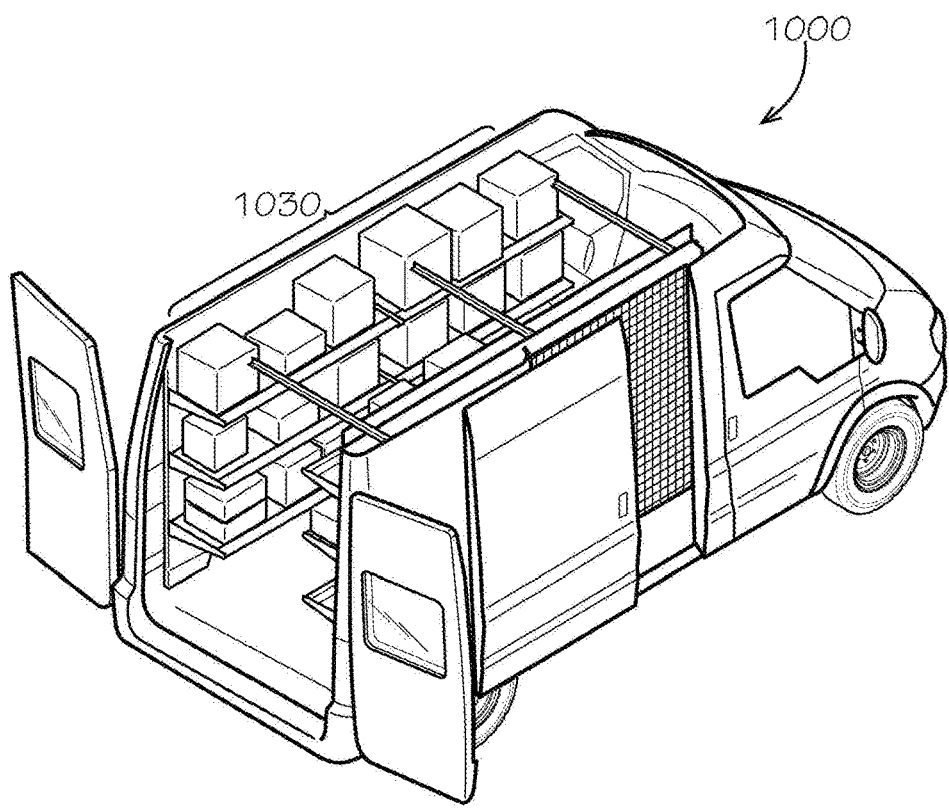
FIG. 4B is a rear perspective view of the vehicle of FIG. 4A with a ceiling cutaway.

A sample of using the vehicle 1000 can be seen and will be described with reference to FIGS. 4-6. With specific reference to FIGS. 4A-4B, the vehicle 1000 can be seen including packages 1300 to be delivered to end consumers. The vehicle 1000 setup in this view can be referred to as an "initial arrangement." As can be seen, the packages 1300 can sit on shelving units 1030, 1050. The vehicle 1000 can be arranged to allow package delivery and maximum use of space within the vehicle 1000 for delivery purpose. In use, the packages 1300 can be delivered to end consumers as per usual delivery procedures. As can be seen, the delivery cargo compartment 1110 can take up most of the space of the cargo compartment 1015 in the initial arrangement, and the space devoted to the collection cargo compartment 1120 can be minimal. The collection system 1200 in the current aspect can be completely collapsed to accommodate maximum loading of deliverable materials (i.e., packages 1300) within the vehicle 1000.

Figure 5A:
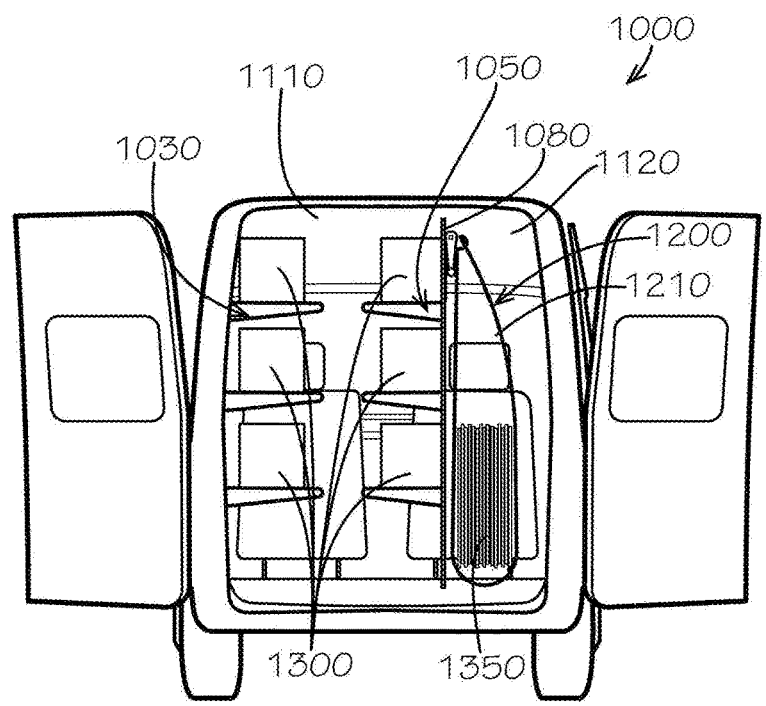
FIG. 5A is a rear side view of the vehicle of FIG. 1A in an intermediate arrangement.
Figure 5B:
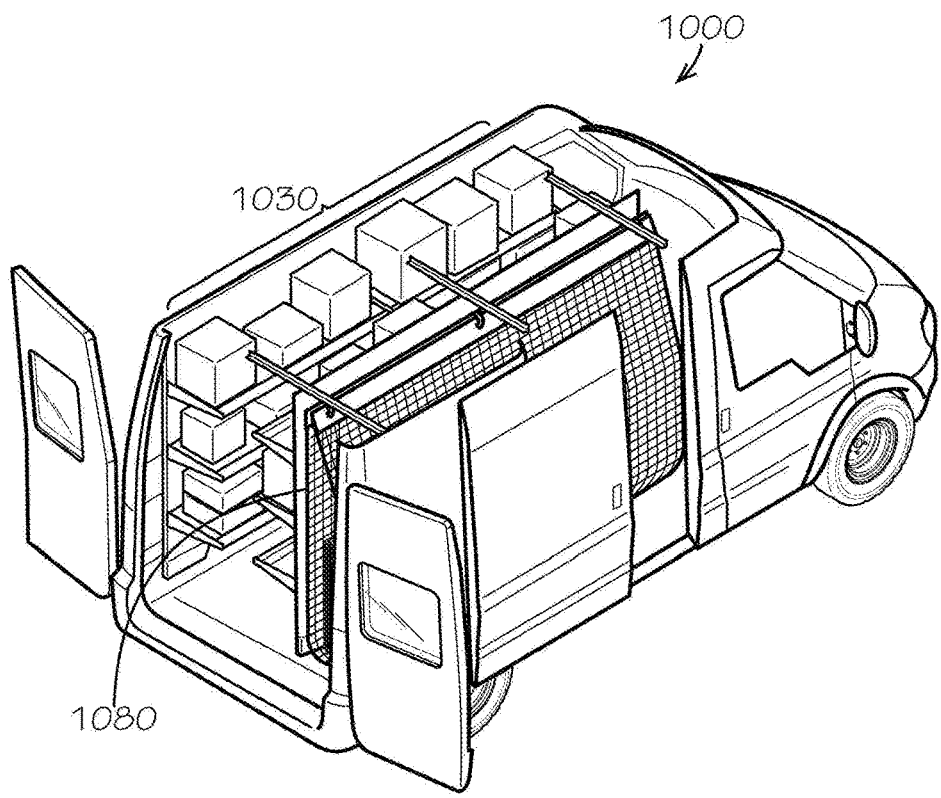
FIG. 5B is a rear perspective view of the vehicle of FIG. 5A with a ceiling cutaway.

With reference to FIGS. 5A-5B, in use, the vehicle 1000 can modulate to accommodate collection needs. The vehicle 1000 setup in this view can be referred to as a "modulated arrangement" or "intermediate arrangement." Specifically, as can be seen, the partition wall 1080 can be linearly actuated toward the center of the vehicle 1000 to reduce space in the delivery cargo compartment 1110 and to increase space in the collection cargo compartment 1120. As can be seen, recovered materials 1350 can be collected and secured within the collection system 1200. Human access to the packages 1300 can be maintained, though, as shelving units 1030, 1050 can be collapsed to maintain access. In various aspects, shelving units 1030,1050 can be partially collapsed or strategically collapsed, with various portions of the shelving units 1030,1050 collapsed while other portions remain intact. In various aspects, the partition wall 1080 can maintain space to grant access to the packages 1300 in the delivery cargo compartment 1110. The collection bladder 1210 can be expanded to allow the insertion of additional recovered materials 1350. In the current aspect, the recovered materials 1350 can be OCC. In various aspects, the recovered materials 1350 can be compressed but need not be. In various aspects, recovered materials 1350 can be various materials. To accommodate the collection of recovered materials 1350, the space of the collection cargo compartment 1120 can be increased by movement of the partition wall 1080.

Figure 6A:
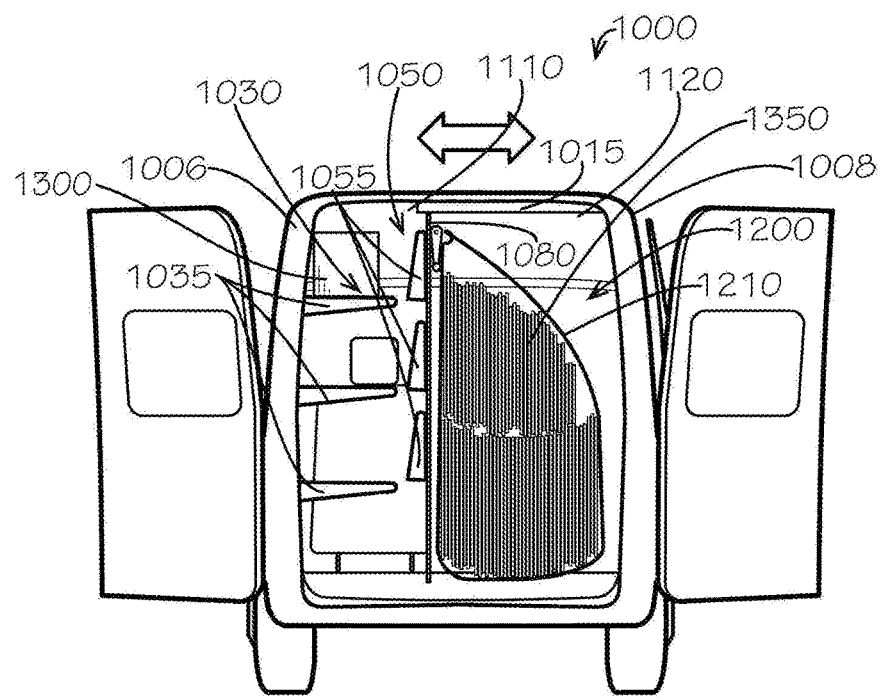
FIG. 6A is a rear side view of the vehicle of FIG. 1A in a nearly completed arrangement.
Figure 6B:
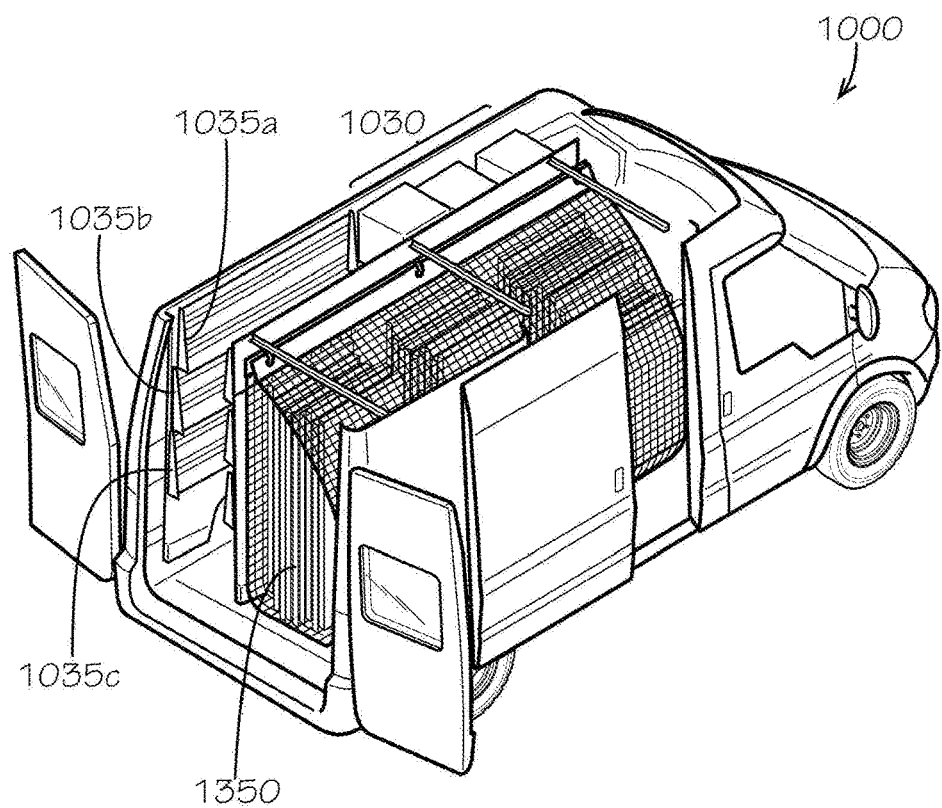
FIG. 6B is a rear perspective view of the vehicle of FIG. 6B with a ceiling cutaway.

With reference to FIGS. 6A-6B, the vehicle 1000 can modulate to accommodate additional collection needs as delivery of packages 1300 continues or completes. The vehicle 1000 setup in this view can be referred to as "completed arrangement" or "nearly completed arrangement." As can be seen, when most or all of the packages 1300 have been delivered, the shelving units 1030,1050 can be substantially collapsed to reduce the amount of space within the cargo compartment 1015 occupied by the shelves 1035, 1055. In particular in the view of FIGS. 6A-6B, all shelves 1055 as well as shelves 1035$a,b,c$ can be arranged in a collapsed arrangement while shelves 1035$d,e,f$ retain packages 1300 in normal or extended arrangement. It can be seen that additional recovered materials 1350 can be collected as the amount of space devoted to the collection cargo compartment 1120 can be increased when the amount of space devoted to the delivery cargo compartment 1110 can be reduced. The collection system 1200 can increase in size to accommodate additional recovered materials 1350, and the collection bladder 1210 can reshape to increase the collection volume of recovered materials 1350. Because the shelves 1055 as well as shelves 1035$a,b,c$ can be arranged in a collapsed arrangement, access to the packages 1300 can be maintained even though the partition wall 1080 can be moved further toward the driver's side 1006. In this way, the vehicle 1000 can accommodate both delivery of packages 1300 and collection of recovered materials 1350 on a single delivery route.

Figure 7A:
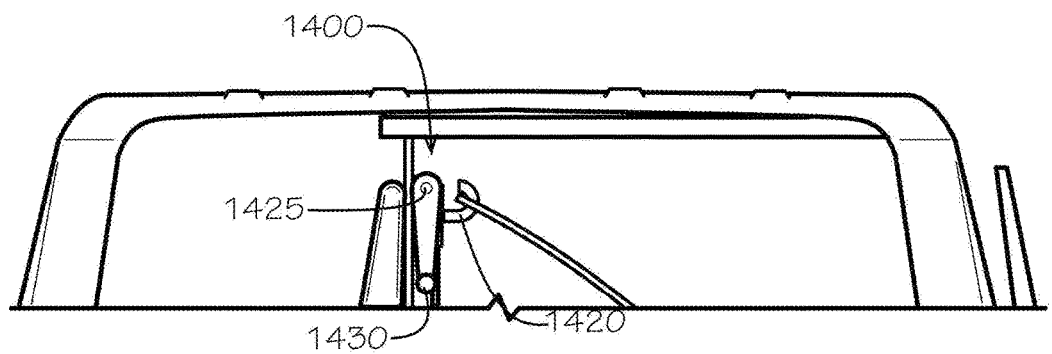
FIG. 7A is a detail side view of a secured release mechanism of the vehicle of FIG. 1A.
Figure 7B:
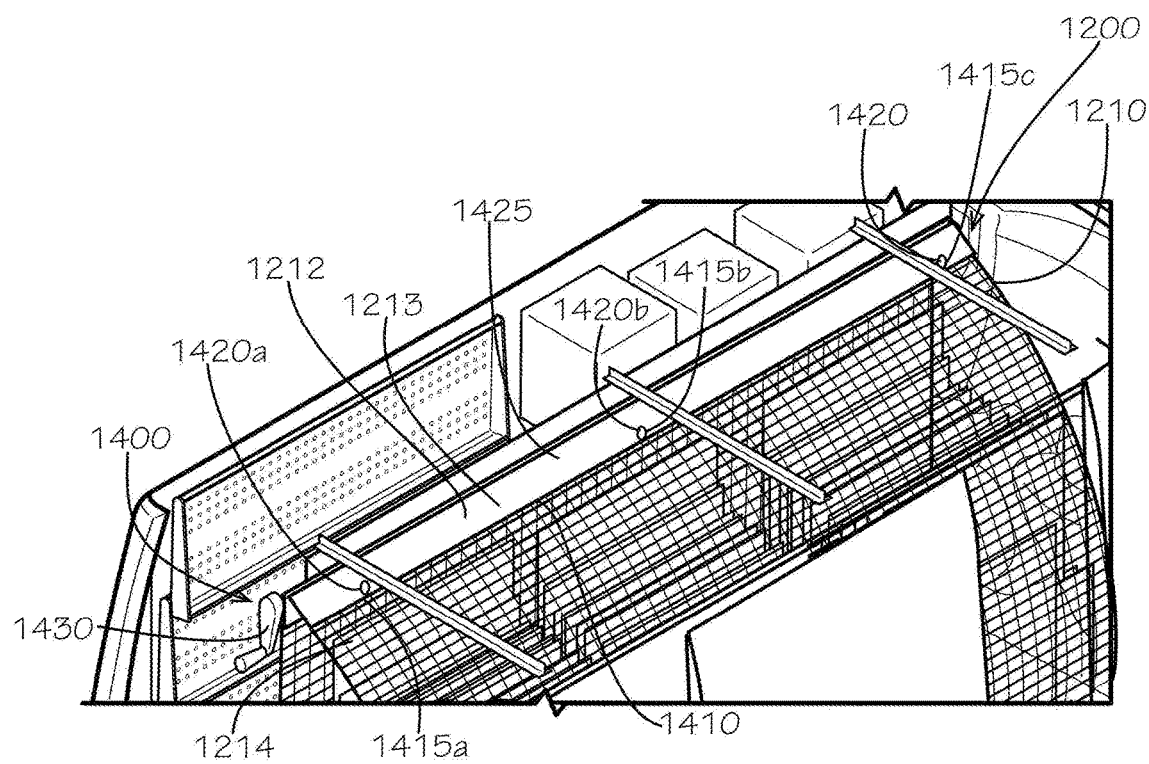
FIG. 7B is a perspective view of the secured release mechanism of FIG. 7A.

As seen with reference to FIG. 7A-7B, the collection system 1210 can include a secured release mechanism 1400. In the current aspect, the secured release mechanism 1400 can include a reinforced portion 1410 of the collection bladder 1210 connected to the top end 1213 of the outer facing bladder side 1214. In the current aspect, the reinforced portion 1410 can be an overlapped portion of material. The reinforced portion 1410 can provide a mechanism for connecting the collection bladder 1210 at the top end 1212. In the current aspect, the reinforced portion 1410 can define a plurality of apertures 1415—in the current aspect, three apertures 1415$a,b,c$ can be utilized, although the number need not be fixed. The secured release mechanism 1400 can comprise a plurality of hooks 1420—in the current aspect, the number of hooks 1420*a*,*b*,*c* can match the number of apertures 1415*a*,*b*,*c*. Each hook 1420 can be connected to a lever arm 1425. In the current aspect, the lever arm 1425 can be a rotating spindle that can allow the hooks 1420*a*,*b*,*c* to move in a rotational arrangement when desired. To actuate the rotational movement of the lever arm 1425, a handle 1430 can be attached to the lever arm 1425 for operation.

As can be seen with reference to FIG. 8, and as previously mentioned, the suspended track system 1095 can be arranged to provide clearance below the ceiling 1022 (not shown in the current view) such that the collection system 1200 can extend out of the rear opening 1021. Linear actuation of the collection system 1200 in a direction from the front end 1002 to the rear end 1004 and vice versa can assist in removing recovered materials 1350 from the vehicle 1000. In this arrangement, the vehicle 1000 can be termed to be in an "extended arrangement" because the collection system 1200 can be extended beyond the rear end 1004.

Removal of recovered materials 1350 can be achieved as indicated with reference to FIGS. 9A-9E. As seen with reference to FIG. 9A, the vehicle 1000 including recovered materials 1350 can be arranged on a loading dock 1600. The loading dock 1600 can include a ramp portion 1610 and a ledge portion 1620. The ledge portion 1620 can be arranged at a height sufficient to allow the vehicle 1000 to access a top opening 1655 defined in a collection receptacle 1650. As such, the vehicle 1000 can be arranged adjacent to the collection receptacle 1650 to allow recovered materials 1350 to become deposited therein.

Figure 8:
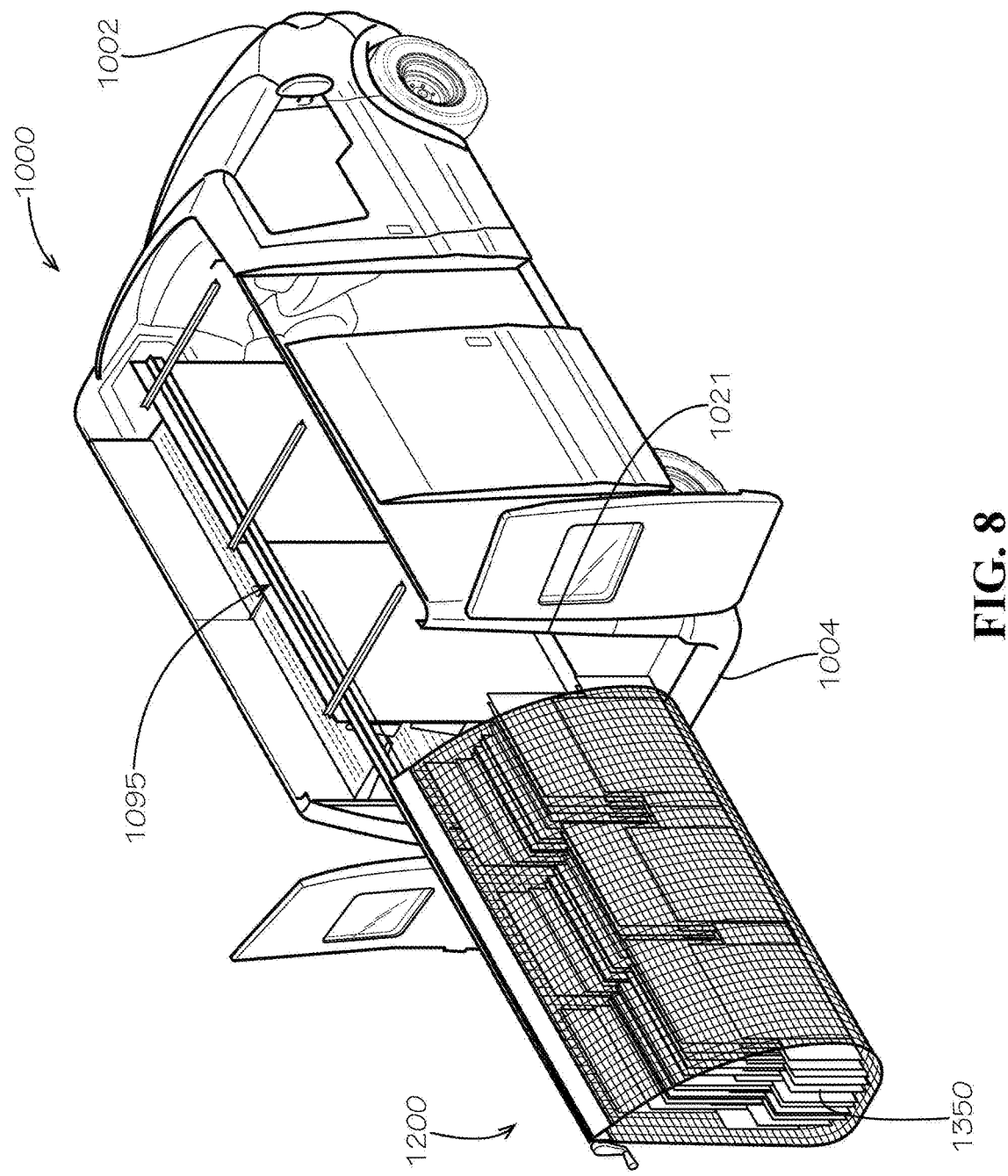
FIG. 8 is a rear perspective view of the vehicle of FIG. 1A in an extended arrangement with a ceiling cutaway.
Figure 9A:
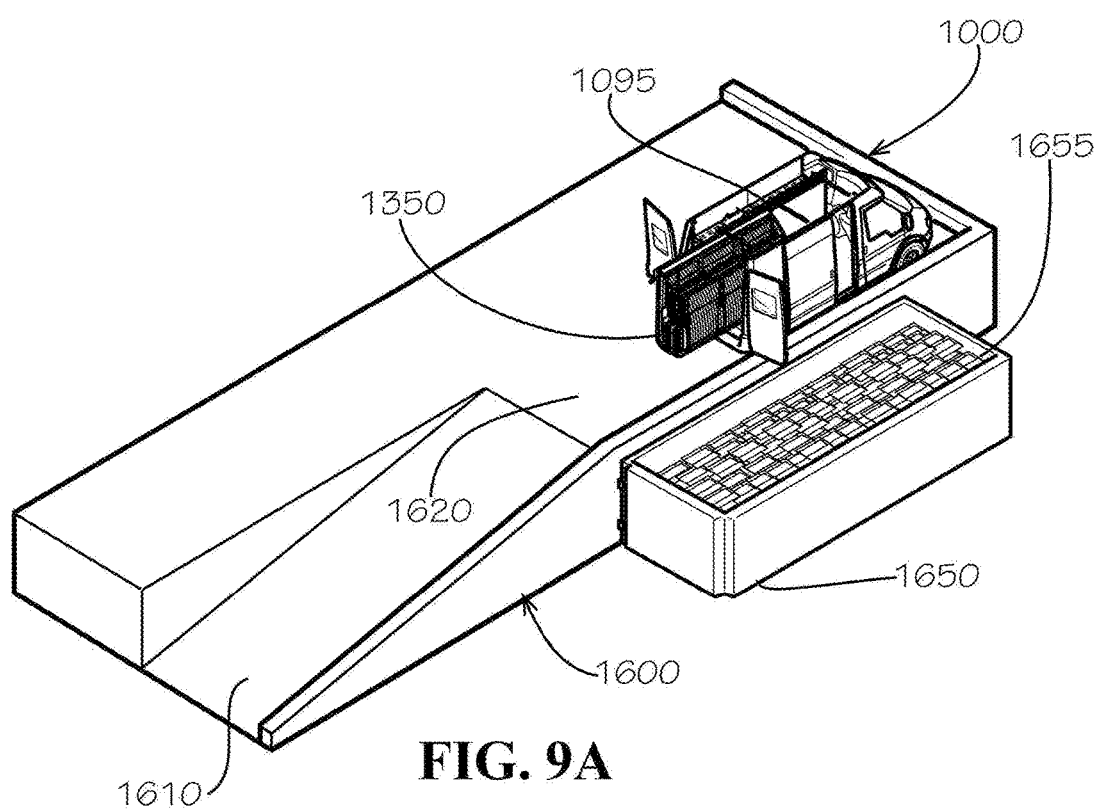
FIG. 9A is a rear perspective view of the vehicle of FIG. 1A arranged adjacent to a receptacle with a ceiling cutaway.
Figure 9B:
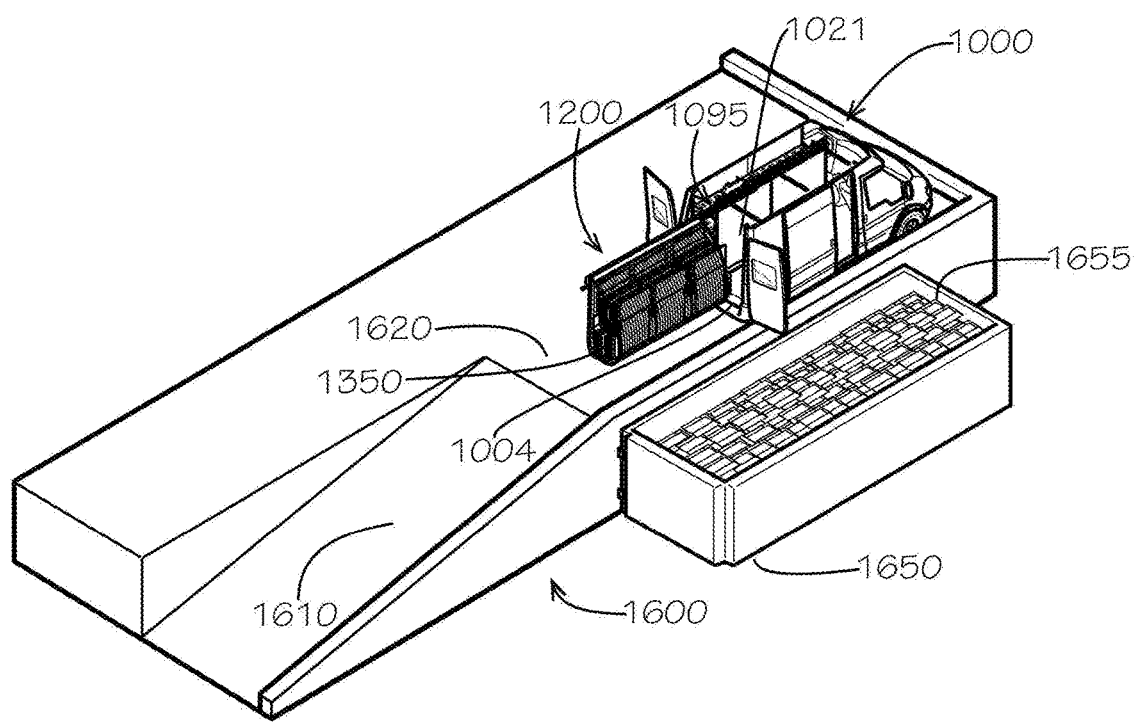
FIG. 9B is a rear perspective view of the vehicle of FIG. 9A in the extended arrangement of FIG. 8.

As seen with direct reference to FIG. 9B, once the vehicle 1000 is arranged, the collection system 1200 can be extended beyond the rear end 1004 and out of the rear opening 1021 as previously indicated with reference to FIG. 8. The collection system 1200 extended behind the rear end 1004 of the vehicle 1000 can allow the recovered materials 1350 to be arranged adjacent to the top opening 1655 of the receptacle 1650. Once aligned, the recovered materials 1350 can be deposited into the receptacle 1650.

Figure 9C:
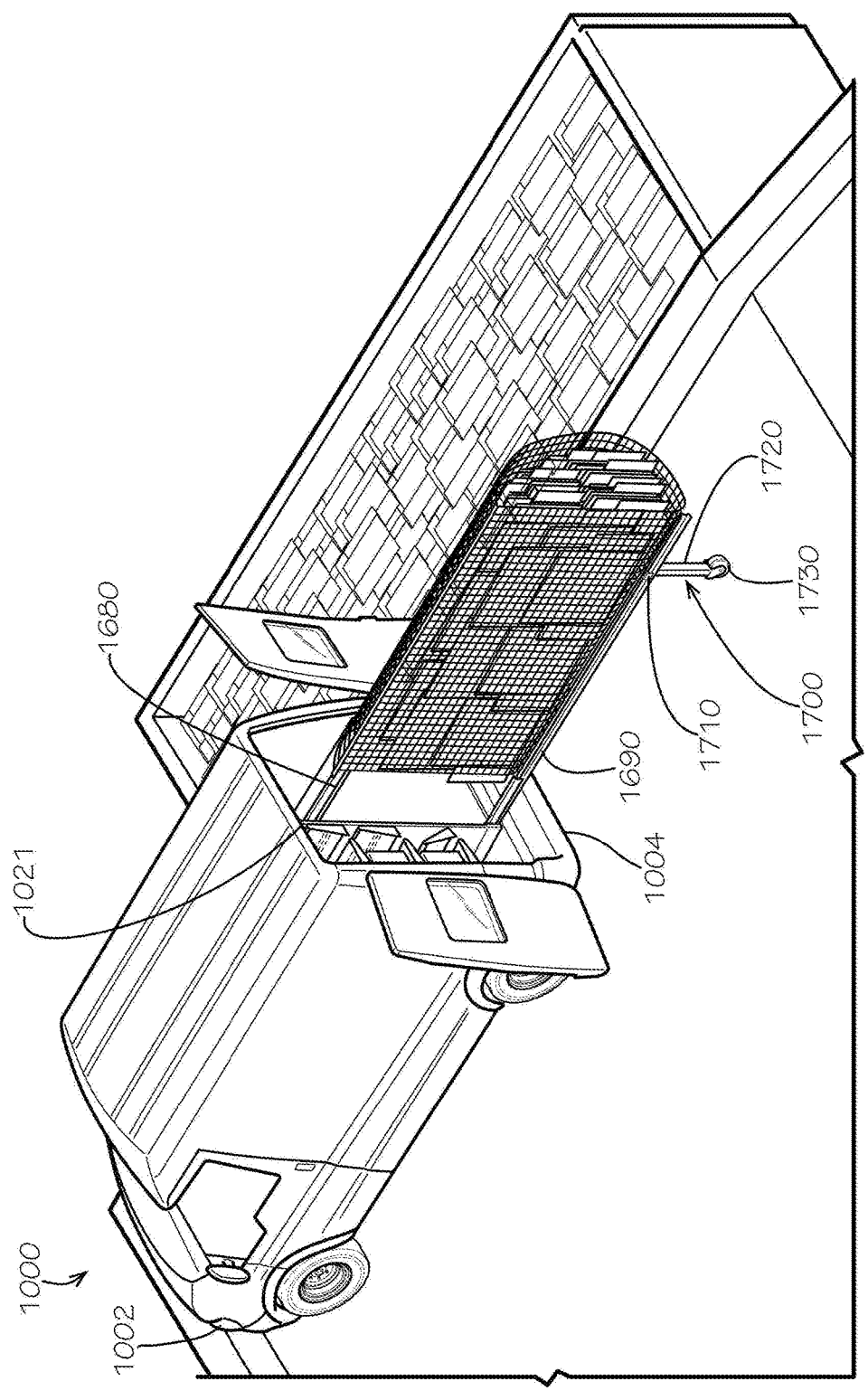
FIG. 9C is an alternative rear perspective view of the vehicle of FIG. 9B.

The vehicle 1000 in extended arrangement can be seen with additional reference to FIG. 9C. The collection system 1200 can comprise the upper track 1680 and a lower track 1690 that can allow the linear actuation of the collection system 1200 away from the partition wall 1080 in a front end 1002 to rear end 1004 direction. In the current aspect, the upper track 1680 and the lower track 1690 can be various tracks, including sliding track ball bearings, sliding linear rails, track rollers, or various other linear actuation systems. In various aspects, the tracks 1680,1690 can be telescoping. Each track 1680,1690 can be securely fixed at one end to the partition wall 1080 to provide a secured connection to the vehicle 1000. Each track 1680,1690 can include a connection to the collection bladder 1210, thereby allowing the collection system 1200 to be linearly actuated in direction of the tracks 1680,1690. One of skill in the art would understand that the tracks 1680,1690 can be of a strong, sturdy arrangement to support the potential weight of recovered materials 1350 within the collection system 1200.

Figure 9D:
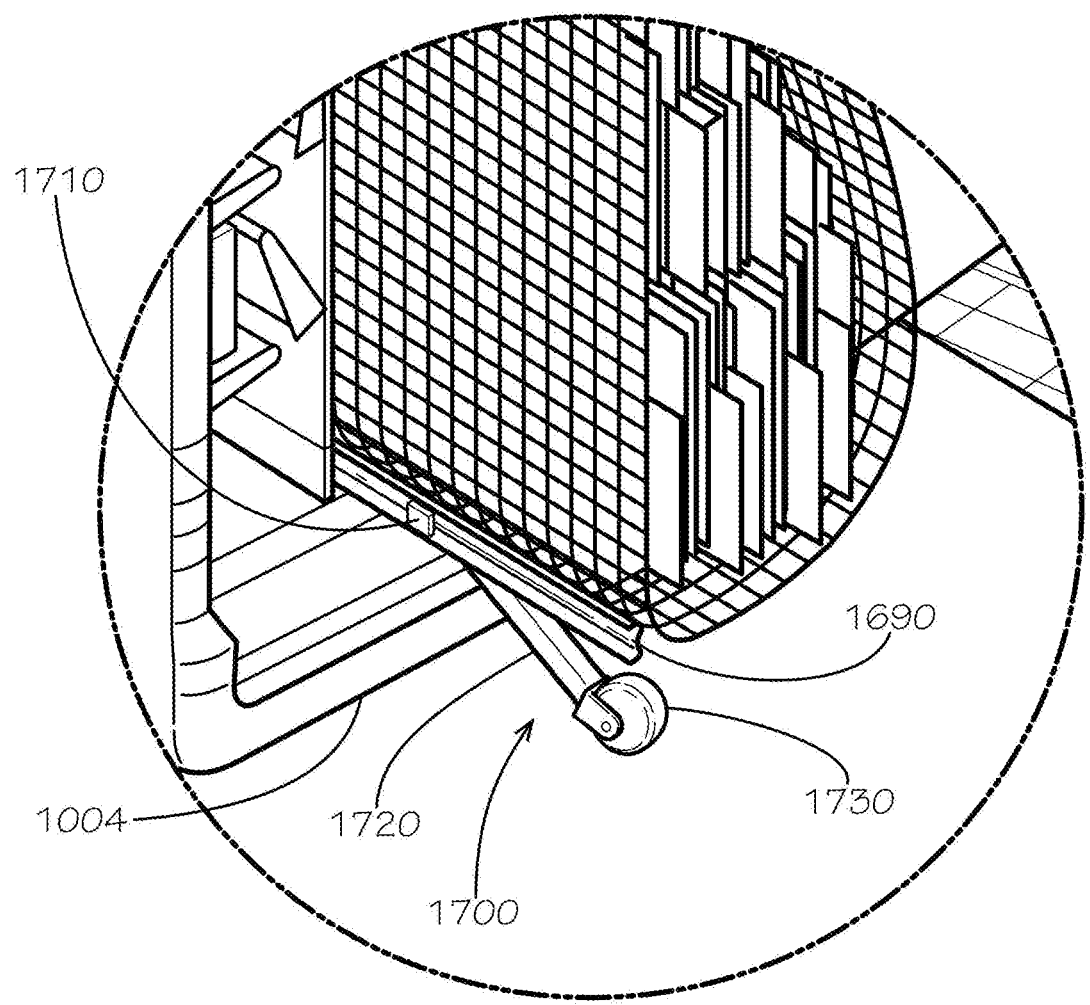
FIG. 9D is a detail view of a support leg of the vehicle of FIG. 9C.

With continuing reference to FIG. 9C and with reference to FIG. 9D, a support leg 1700 can be included and can be attached to the lower track 1690 to aid in supporting the weight of the recovered materials 1350. The support leg 1700 can be hingedly connected to a side of the lower track 1690 at a hinge point 1710. In various aspects, the support leg 1700 can be spring-loaded to allow expansion of the support leg 1700 immediately when the hinge point 1710 clears the rear end 1004. The support leg 1700 can comprise a shaft 1720 with one end disposed in arrangement connected to the hinge point 1710. The support leg 1700 can comprise a wheel 1730 connected to a second end of the shaft 1720.

The support leg 1700 can remain contracted while the collection system 1200 is retained within the vehicle 1000. As the collection system 1200 is extended outside of the vehicle 1000 and into the extended arrangement, the support leg 1700 can release freely from its contracted position to an extended position to support the collection system 1200. Once the wheel 1730 is in contact with the ground, the stress to the tracks 1680,1690 of additional linear actuation of the collection system 1200 beyond the rear opening 1021 can be alleviated by ground support from the support leg 1700.

Figure 9E:
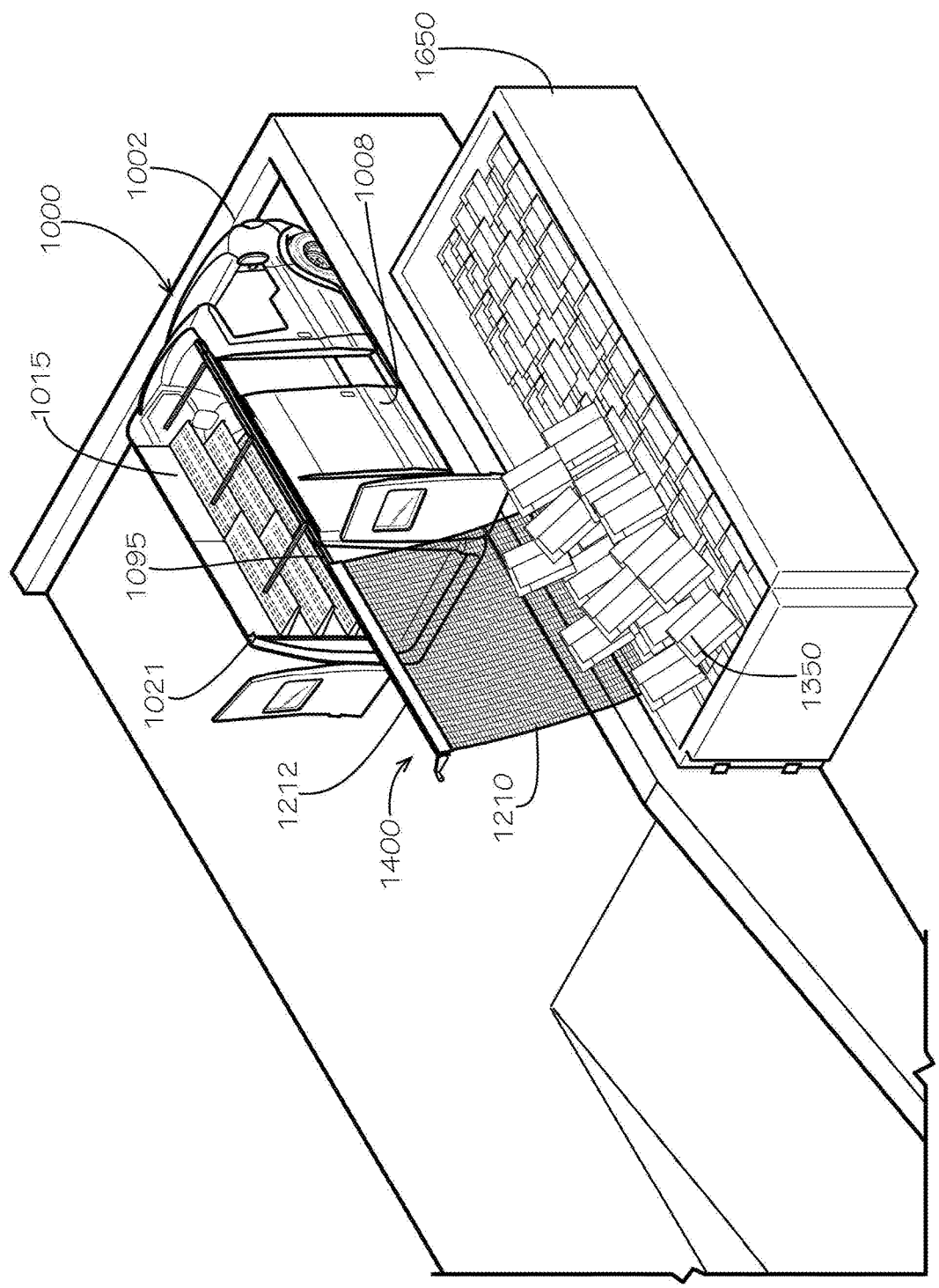
FIG. 9E is a rear perspective view of the vehicle of FIG. 9B with a collection system opened and recovered materials depositing into the receptacle.

As seen with direct reference to FIG. 9E, the recovered materials 1350 can be deposited into the receptacle 1650 by allowing the collection bladder 1210 to detach from the top end 1212. As previously mentioned with reference to FIGS. 7A-7B, disconnection of the collection bladder 1210 can be achieved by actuation of the secured release mechanism 1400. In the current aspect, the secured release mechanism 1400 can be actuated by rotation of the handle 1430, and rotation of the handle 1430 can cause the hooks 1420 (not shown in the view of FIG. 9E) to retract through the apertures 1415 (not shown in the view of FIG. 9E), thereby allowing a free release of the top end 1213 (not shown in the view of FIG. 9E) and the reinforced portion 1410 (not shown in the view of FIG. 9E).

Once the recovered materials 1350 are cleared from the collection system 1200, the collection bladder 1210 can be reattached by arrangement of the hooks 1420 in alignment with the apertures 1415 and counter-rotation of the handle 1430 to allow the collection system 1200 to return to its arranged state. The collection system 1200 can then be linearly actuated along the suspended track system 1095 toward the front end 1002 of the vehicle 1000 and back through the rear opening 1021 of the vehicle 1000, where it can rest within the cargo compartment 1015. Once within the cargo compartment 1015, the partition wall 1080 can be arranged proximate the passenger side 1008 by linear actuation along the floor track system 1091 and the suspended track system 1095. Once the partition wall 1080 is arranged within the vehicle 1000, the vehicle 1000 can be prepared to begin another delivery and collection cycle.

In various arrangements, additional apparatus can be included along with the vehicle 1000 to facilitate collection of recovered materials 1350. For example, in various aspects, the vehicle 1000 can include towing capabilities and, in various aspects, the vehicle 1000 can include a baler towed behind the vehicle. One suitable example of a baler can comprise an M-30 STD Mini-Baler/Vertical Baler, by Ver-Tec, Rockford, Minn. 55373. One of skill in the art would understand that various baler models and arrangements can be utilized without departing from the scope of the current disclosure. Additional helpful apparatus for compressing recovered materials 1350 would be understood by one of skill in the art and can be included as determined to be suitable.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A vehicle comprising:
   a front end, a rear end, a driver's side, and a passenger's side, the vehicle defining a cargo compartment proximate the rear end;
   a partition wall movably disposed within the cargo compartment, the partition wall defining a partition such that the cargo compartment defines a delivery cargo compartment and a collection cargo compartment;
   a delivery storage unit disposed within the delivery cargo compartment; and
   a collection system disposed within the collection cargo compartment.

2. The vehicle of claim 1, wherein the collection system is connected to the partition wall.

3. The vehicle of claim 1, wherein the partition wall is connected to the vehicle along a floor track system connected to a floor of the cargo compartment and along a suspended track system connected to a ceiling of the vehicle.

4. The vehicle of claim 1, wherein the collection system comprises a collection bladder, the collection bladder being of variable volume.

5. The vehicle of claim 4, wherein the collection system comprises a secured release mechanism, the secured release mechanism configured to releasably connect an end of the collection bladder to the partition wall.

6. The vehicle of claim 4, wherein the collection bladder is made of mesh material.

7. The vehicle of claim 1, wherein the delivery storage unit comprises a shelving unit, the shelving unit comprising a plurality of shelves, wherein at least one of the shelves is collapsible.

8. The vehicle of claim 1, wherein the collection system is configured to move linearly in a direction toward and away from the driver's side and the passenger's side within the cargo compartment.

9. The vehicle of claim 1, wherein the collection system is configured to move linearly in a direction toward and away from front end and the rear end of the vehicle.

10. The vehicle of claim 9, wherein a rear opening is defined by the vehicle proximate the rear end, wherein the collection system is configured to move linearly through the rear opening.

11. The vehicle of claim 10 further comprising a support leg connected to the partition wall, the support leg configured to move from a contracted position to an extended position when the partition wall is moved linearly through the rear opening.

12. An apparatus for connection to a vehicle, the apparatus comprising:
    a partition wall, the partition wall comprising a first side and a second side;
    a shelving unit connected to the first side of the partition wall;
    a collection system connected to the second side of the partition wall; and
    a linear track system connected to at least one end of the partition wall, the track system configured for connection to the vehicle.

13. The apparatus of claim 12, wherein the collection system comprises a collection bladder, the collection bladder being of variable volume.

14. The apparatus of claim 13, wherein the collection system comprises a secured release mechanism, the secured release mechanism configured to releasably connect an end of the collection bladder to the partition wall.

15. The apparatus of claim 13, wherein the collection bladder is made of mesh material.

16. A method of delivering packages and collecting recovered materials, the method comprising the steps of:
    obtaining a vehicle, the vehicle comprising
       a front end, a rear end, a driver's side, and a passenger's side, the vehicle defining a cargo compartment proximate the rear end;
       a partition wall movably disposed within the cargo compartment, the partition wall defining a partition such that the cargo compartment defines a delivery cargo compartment and a collection cargo compartment;
       a delivery storage unit disposed within the delivery cargo compartment; and,
       a collection system disposed within the collection cargo compartment, the vehicle arranged in an initial state and comprising packages arranged within the delivery cargo compartment;
    removing at least one of the packages;
    collecting a recovered material;
    arranging the recovered material within the collection system; and,
    linearly actuating the partition wall to alter the size of the delivery cargo compartment and the collection cargo compartment in response to the removal of the package and the collection of the recovered material.

17. The method of claim 16, wherein the step of linearly actuating the partition wall comprises arranging the vehicle in an intermediate arrangement.

18. The method of claim 17, further comprising the steps of
    removing all packages;
    collapsing the delivery storage unit; and, linearly actuating the partition wall to further alter the size of the delivery cargo compartment and the collection cargo compartment such that the vehicle is arranged in a completed arrangement.

19. The method of claim 18, further comprising the steps of
arranging the vehicle proximate a receptacle; and,
arranging the collection system beyond an opening defined in the rear end of the vehicle such that the vehicle is arranged in an extended arrangement.

20. The method of claim 19, further comprising the steps of
actuating a secured release mechanism of the collection system such that recovered materials deposit within the receptacle; and
actuating the secured release mechanism to secure the collection system without recovered materials.

\* \* \* \* \*